United States Patent
Huang (10) Patent No.: US 12,127,274 B1
(45) Date of Patent: Oct. 22, 2024

(54) METHOD AND SYSTEM FOR INTERACTION BETWEEN INTELLIGENT DEVICE AND VEHICLE-MOUNTED SYSTEM, AND DEVICE

(71) Applicant: Shenzhen Shengshixiangchuan Technology Co., Ltd., Shenzhen (CN)

(72) Inventor: Jingzeng Huang, Shenzhen (CN)

(73) Assignee: Shenzhen Shengshixiangchuan Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/779,208

(22) Filed: Jul. 22, 2024

(51) Int. Cl.
*H04W 4/40* (2018.01)
*H04W 76/10* (2018.01)

(52) U.S. Cl.
CPC ............ *H04W 76/10* (2018.02); *H04W 4/40* (2018.02)

(58) Field of Classification Search
CPC ................................ H04W 76/10; H04W 4/40
USPC ............................................................ 455/41.2
See application file for complete search history.

(56) References Cited

U.S. PATENT DOCUMENTS

| | | | | |
|---|---|---|---|---|
| 2012/0069131 A1* | 3/2012 | Abelow | ............ | G06Q 30/0601 345/589 |
| 2016/0196131 A1* | 7/2016 | Searle | ..................... | H04L 65/40 717/173 |
| 2016/0196132 A1* | 7/2016 | Searle | ....................... | G06F 8/65 717/173 |
| 2016/0291940 A1* | 10/2016 | Searle | ................... | H04L 67/303 |
| 2016/0291959 A1* | 10/2016 | Searle | ................... | H04L 41/082 |
| 2016/0294605 A1* | 10/2016 | Searle | ................... | H04L 41/069 |
| 2016/0294614 A1* | 10/2016 | Searle | ..................... | H04L 67/34 |
| 2019/0075168 A1* | 3/2019 | Goldfarb | ............. | H04L 63/0272 |
| 2019/0260547 A1* | 6/2019 | Nammi | ................. | H04L 5/0058 |
| 2020/0178048 A1* | 6/2020 | Kim | ..................... | H04W 12/062 |
| 2021/0099870 A1* | 4/2021 | Moon | ................... | G08G 5/0043 |
| 2021/0157312 A1* | 5/2021 | Cella | ..................... | G01M 13/045 |
| 2021/0219105 A1* | 7/2021 | Fan | ......................... | H04W 4/46 |
| 2021/0266726 A1* | 8/2021 | Chun | ..................... | H04W 8/005 |
| 2021/0356279 A1* | 11/2021 | Szigeti | ............... | G01C 21/3407 |
| 2022/0108262 A1* | 4/2022 | Cella | ....................... | G05B 17/02 |
| 2023/0136756 A1* | 5/2023 | Malboubi | .............. | G06N 20/00 709/224 |
| 2023/0186201 A1* | 6/2023 | Cella | ................ | G05B 19/41885 705/7.17 |

(Continued)

*Primary Examiner* — April G Gonzales
(74) *Attorney, Agent, or Firm* — Olive Law Group, PLLC (57) ABSTRACT

A method for interaction between an intelligent device and a vehicle-mounted system comprises: judging whether an interaction type corresponding to an interaction request is within a processing range; if the interaction type is within the processing range, judging whether the interaction mode is a forwarding mode; if the interaction type is the forwarding mode, taking an interactive data stream as a target data stream; otherwise, converting the interactive data stream compiled based on an operating system of the target device into an interactive data stream corresponding to an operating system of the vehicle-mounted system as the target data stream; adding the target data stream and a queuing value determined according to a priority of the target device and a parameter carried by the interaction request as associated data to an interactive queuing library; and sending the interactive data stream in the interactive queuing library to the vehicle-mounted system.

10 Claims, 4 Drawing Sheets

(56) References Cited

U.S. PATENT DOCUMENTS

| | | | |
|---|---|---|---|
| 2023/0196230 A1* | 6/2023 | Cella | G06V 10/82 |
| | | | 705/7.17 |
| 2023/0281527 A1* | 9/2023 | Cella | G06V 20/17 |
| | | | 705/7.17 |

* cited by examiner

METHOD AND SYSTEM FOR INTERACTION BETWEEN INTELLIGENT DEVICE AND VEHICLE-MOUNTED SYSTEM, AND DEVICE

TECHNICAL FIELD

The present invention relates to the technical field of vehicle-machine interaction, in particular to a method and system for interaction between an intelligent device and a vehicle-mounted system, and a device.

BACKGROUND

With the continuous development of intelligence and networking, vehicles equipped with vehicle-mounted system are widely used. In the prior art, automobile third-party application experience is generally provided through pre-installation or installation of vehicle-mounted systems.

Intelligent devices such as mobile phones and tablet computers, as an indispensable part of work and life, generally need to be carried at any time. Interconnection between the intelligent device and the vehicle-mounted system is conducive to improving the automobile third-party application experience.

At present, only the intelligent devices and the vehicle-mounted systems with the same operating system can be interconnected, while the intelligent devices and the vehicle-mounted systems with different operating systems cannot be interconnected, which is not conducive to fully improving the automobile third-party application experience.

SUMMARY

Based on this, it is necessary to provide a method and system for interaction between an intelligent device and a vehicle-mounted system, and a device for the technical problem the prior art that intelligent devices and vehicle-mounted systems with different operating systems cannot be interconnected.

In a first aspect, there is provided a method for interaction between an intelligent device and a vehicle-mounted system, wherein the method is applied to an adapter device, and the method includes:
  acquiring an interaction request sent by a target device, wherein the target device is an intelligent device in communication connection with the adapter device successfully;
  judging whether an interaction type corresponding to the interaction request is within a processing range according to an interaction mode corresponding to the target device and an allowable type table corresponding to the vehicle-mounted system;
  if the interaction type is within the processing range, judging whether the interaction mode corresponding to the target device is a forwarding mode;
  if the interaction type is the forwarding mode, taking an interactive data stream corresponding to the interaction request as a target data stream; otherwise, converting the interactive data stream compiled based on an operating system of the target device into an interactive data stream corresponding to an operating system of the vehicle-mounted system as the target data stream;
  determining a queuing value of the target data stream according to a priority of the target device and a parameter carried by the interaction request as a target queuing value, and adding the target data stream and the target queuing value as associated data to an interactive queuing library; and
  sending the interactive data stream in the interactive queuing library to the vehicle-mounted system.

In a second aspect, there is provided a system for interaction between an intelligent device and a vehicle-mounted system, wherein the system is applied to an adapter device, and the system includes:
  a request acquisition module configured for acquiring an interaction request sent by a target device, wherein the target device is an intelligent device in communication connection with the adapter device successfully;
  a first judging module configured for judging whether an interaction type corresponding to the interaction request is within a processing range according to an interaction mode corresponding to the target device and an allowable type table corresponding to the vehicle-mounted system;
  a second judging module configured for, if the interaction type is within the processing range, judging whether the interaction mode corresponding to the target device is a forwarding mode;
  a target data stream determination module configured for, if the interaction type is the forwarding mode, taking an interactive data stream corresponding to the interaction request as a target data stream; otherwise, converting the interactive data stream compiled based on an operating system of the target device into an interactive data stream corresponding to an operating system of the vehicle-mounted system as the target data stream;
  a queuing cache module configured for determining a queuing value of the target data stream according to a priority of the target device and a parameter carried by the interaction request as a target queuing value, and adding the target data stream and the target queuing value as associated data to an interactive queuing library; and
  a processing module configured for sending the interactive data stream in the interactive queuing library to the vehicle-mounted system.

In a third aspect, there is provided an adapter device, wherein the adapter device includes: a wired communication part, a Bluetooth part, a memory, a processor and a computer program stored in the memory and executable on the processor, wherein the processor is connected with the wired communication part and the Bluetooth part, the adapter device is in communication connection with a vehicle-mounted system through the wired communication part, the adapter device is in communication connection with a target device through the Bluetooth part, and the processor executes the computer program to realize the steps of the method for interaction between the intelligent device and the vehicle-mounted system mentioned above.

The method and system for interaction between the intelligent device and the vehicle-mounted system, and the device provided by the present invention are beneficial to fully improving automobile third-party application experience by enabling the intelligent device and the vehicle-mounted system with different operating systems to be interconnected. In addition, the queuing value of the target data stream is determined as the target queuing value according to the priority of the target device and the parameter carried by the interaction request, and the target data stream and the target queuing value are added to the interactive queuing library as the associated data, thus providing a foundation for the effective queuing execution of the target data stream and further improving the automobile third-party application experience.

BRIEF DESCRIPTION OF THE DRAWINGS

In order to illustrate the technical solutions in the embodiments of the present invention or in the related art more clearly, the drawings used in the description of the embodiments or the prior art will be briefly described below. Obviously, the drawings in the following description are merely some embodiments recorded in the present invention. For those of ordinary skills in the art, other drawings may also be obtained based on these drawings without going through any creative work.

Wherein.

DETAILED DESCRIPTION

The following clearly and completely describes the technical solutions in the embodiments of the present invention with reference to the drawings in the embodiments of the present invention. Apparently, the described embodiments are merely some but not all of the embodiments of the present invention. Based on the embodiments of the present invention, all other embodiments obtained by those of ordinary skills in the art without going through any creative work shall fall within the protection scope of the present invention.

Figure 1:
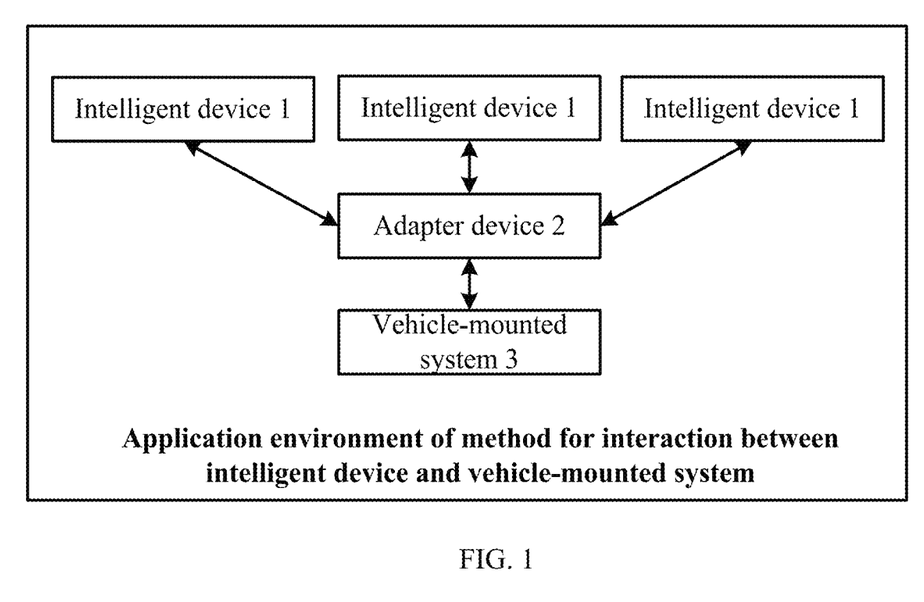
FIG. 1 is an application environment diagram of a method for interaction between an intelligent device and a vehicle-mounted system in one embodiment.

A method for interaction between an intelligent device and a vehicle-mounted system provided by the embodiments of the present invention may be applied in an application environment as shown in FIG. 1, wherein the application environment includes at least one intelligent device 1, an adapter device 2 and a vehicle-mounted system 3. Wired or wireless communication connection is realized between the intelligent device 1 and the adapter device 2. Wired or wireless communication connection is realized between the vehicle-mounted system 3 and the adapter device 2. It can be understood that the operating systems of each intelligent device 1 may be the same or different. The operating systems of the Intelligent device 1 and the vehicle-mounted system 3 may be the same or different.

The vehicle-mounted system refers to one set of integrated system installed inside the vehicle, which usually includes functions such as vehicle-mounted entertainment system, navigating system and communication system.

Alternatively, the vehicle-mounted system includes, but is not limited to CarPlay and Android Auto.

CarPlay is a vehicle-mounted system released by Apple in the United States, which seamlessly combines an iOS device of a user, iOS use experience and dashboard system.

Android Auto is an Android function designed for automobiles by Google, which needs to be connected to a mobile phone.

Alternatively, the adapter device 2 adopts a CPU main control chip (that is, a chip of a processor of the adapter device 2) to carry a Linux system, and is equipped with a separate Bluetooth module (that is, a Bluetooth part of the Bluetooth part 2) and an external antenna. Linux system is a Unix-like operating system that is free to use and spread.

The operating system of the intelligent device 1 may be any one of the operating systems such as Android system, iOS system (commercial operating system of Unix), Harmony system, and the like.

The operating system of the intelligent device 3 may be any one of the operating systems such as Android system, iOS system (commercial operating system of Unix), Harmony system, and the like.

The adapter device 2 is configured to realize the method for interaction between an intelligent device and a vehicle-mounted system of the present application.

It can be understood that when the adapter device 2 completes communication connection with the vehicle-mounted system 3, the adapter device 2 constructs a data channel between the adapter device 2 and the vehicle-mounted system 3 according to the operating system of the adapter device 2 and the operating system of the vehicle-mounted system 3, and the adapter device 2 sends an interactive data stream in an interactive queuing library to the vehicle-mounted system through the data channel.

The present invention is described in detail hereinafter with reference to the specific embodiments.

Figure 2:
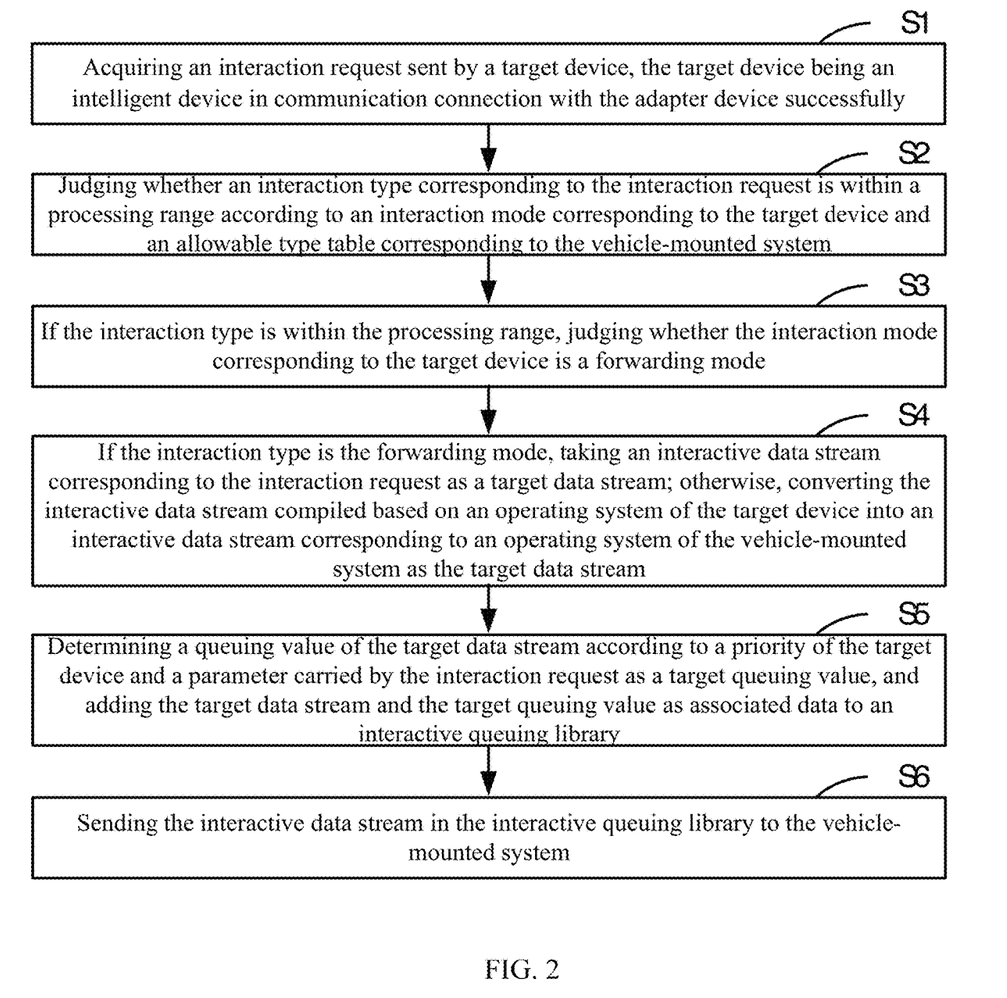
FIG. 2 is a flow chart of a method for interaction between an intelligent device and a vehicle-mounted system in one embodiment.

Please refer to FIG. 2, which shows a schematic flowchart of a method for interaction between an intelligent device and a vehicle-mounted system provided by the embodiments of the present invention. The method is applied to an adapter device, and the method includes the following steps.

At S1, an interaction request sent by a target device is acquired, wherein the target device is an intelligent device in communication connection with the adapter device successfully.

First, the intelligent device establishes a communication connection with the adapter device, and after the communication connection is successfully established between the intelligent device and the adapter device, the intelligent device is taken as the target device.

Specifically, when the target device needs to interact with the vehicle-mounted system, the target device sends the interaction request to the adapter device. The adapter device acquires the interaction request sent by the target device through the communication connection with the target device.

The interaction request is a request for the intelligent device to interact with the vehicle-mounted system. Alternatively, the interaction request may be any one of a music playing request, a video entertainment request, a navigation guidance request and a call communication request.

At S2, it is judged whether an interaction type corresponding to the interaction request is within a processing range according to an interaction mode corresponding to the target device and an allowable type table corresponding to the vehicle-mounted system.

The interaction mode includes: a forwarding mode and a conversion mode. The forwarding mode is a mode that directly forwards input data to the vehicle-mounted system. The conversion mode is a mode that converts the input data and then forwards the data to the vehicle-mounted system. If the operating system of the vehicle-mounted system and the operating system of the target device are the same, the interaction mode corresponding to the target device is the forwarding mode. If the operating system of the vehicle-mounted system and the operating system of the target device are not the same, the interaction mode corresponding to the target device is the conversion mode.

Specifically, if the interaction mode corresponding to the target device is the forwarding mode, it is directly determined that the interaction type corresponding to the interaction request is within the processing range, that is, the processing range in this case includes all. If the interaction mode corresponding to the target device is the conversion mode, the interaction type corresponding to the interaction request is queried in the allowable type table corresponding to the vehicle-mounted system. If the search is successful, it is determined that the interaction type corresponding to the interaction request is within the processing range; if the search fails, it is determined that the interaction type corresponding to the interaction request is not within the processing range, that is, the processing range in this case is the allowable type table corresponding to the vehicle-mounted system.

It can be understood that if the interaction type corresponding to the interaction request is not within the processing range, in this case, there is no need to process the interaction of the vehicle-mounted system corresponding to the interaction request. Therefore, a processing rejection signal is generated according to the interaction request, and then the processing rejection signal is sent to the target device. The target device is configured for reminding interaction failure according to the processing rejection signal.

The allowable type table is a description table of interaction type that allows the operating system corresponding to the type table to interact with other operating systems (operating systems other than the operating system corresponding to the allowable type table).

At S3, if the interaction type is within the processing range, it is judged whether the interaction mode corresponding to the target device is the forwarding mode.

Specifically, if the interaction type is within the processing range, that is, the interaction type corresponding to the interaction request is within the processing range, it means that processing judgment in next step can be carried out in this case, so it is judged whether the interaction mode corresponding to the target device is the forwarding mode.

At S4, if the interaction type is the forwarding mode, an interactive data stream corresponding to the interaction request is taken as a target data stream; otherwise, the interactive data stream compiled based on an operating system of the target device is converted into an interactive data stream corresponding to an operating system of the vehicle-mounted system as the target data stream.

Specifically, if the interaction type is the forwarding mode, that is, the interaction mode corresponding to the target device is the forwarding mode, in this case, it means that no conversion is needed. Therefore, the interactive data stream corresponding to the interaction request is directly taken as the target data stream. Otherwise, that is, the interaction mode corresponding to the target device is not the forwarding mode (the interaction mode corresponding to the target device is the conversion mode), in this case, it means that conversion is needed. Therefore, the interactive data stream compiled based on the operating system of the target device is converted into the interactive data stream corresponding to the operating system of the vehicle-mounted system, and the interactive data stream corresponding to the operating system of the vehicle-mounted system obtained by conversion is taken as the target data stream, such that the target data stream can be processed by the vehicle-mounted system.

The interactive data stream corresponding to the interaction request may be a data stream carried by the interaction request, and may also be a data stream acquired from the target device after the interaction request.

The target data stream is a data stream that needs to be processed by the vehicle-mounted system.

At S5, it is determined a queuing value of the target data stream according to a priority of the target device and a parameter carried by the interaction request as a target queuing value, and the target data stream and the target queuing value are added as associated data to an interactive queuing library.

Specifically, based on a preset mapping table, the queuing value of the target data stream is determined according to the priority of the target device and the parameter carried by the interaction request, and the priority of the target data stream determined is taken as the target queuing value. The target data stream and the target queuing value are added to the interactive queuing library as associated data, so that the priority and the converted data stream are determined in advance, and efficiency of extracting the interactive data stream from the interactive queuing library and sending the interactive data stream to the vehicle-mounted system is improved.

Alternatively, the target data streams in the interactive queuing library are arranged according to the target queuing value by adopting a preset queuing mode with the interactive queuing library. Therefore, it is beneficial to quickly extracting the interactive data stream with the highest target queuing value. The preset queuing mode with the interactive queuing library includes: positive sequence or reverse sequence.

Alternatively, the priority of the target device is determined according to connection times of each intelligent device successfully connected by the adapter device at present, wherein the more the connection times are, the higher the priority of the target device is.

Alternatively, the priority of the target device is determined according to connection times of each intelligent device successfully connected by the adapter device in a preset time window, wherein the more the connection times are, the higher the priority of the target device is.

Alternatively, the priority of the target device is data pre-stored in the adapter device.

It can be understood that for interactions with the same priority, the higher the priority of the target device is, the higher the target queuing value is. For interactions with the same priority, the higher the priority carried by the interaction request is, the higher the target queuing value is. Therefore, the priority of the target data stream is determined more intelligently, which is beneficial to further improving the automobile third-party application experience.

The step of determining the queuing value of the target data stream according to the priority of the target device and the parameter carried by the interaction request as the target queuing value, includes: mapping a mapping value in a first mapping table as a first mapping value according to the priority of the target device; mapping a mapping value in a second mapping table as a second mapping value according to priority data in the parameter carried by the interaction request; and inputting the first mapping value and the second mapping value into a first function for calculation to obtain the target queuing value; wherein, the priority data in the parameter carried by the interaction request includes: one or more of a priority of the interaction type corresponding to the interaction request and a user priority.

The user priority is a priority entered by the user and a priority that the user wants.

Alternatively, the first function is a linear function fitted by a curve fitting method.

The mapping value is a specific value. The first mapping table is data describing a corresponding relationship between the priority and the mapping value. The second mapping table is data describing a corresponding relationship between the priority and the mapping value. It can be understood that in the first mapping table and the second mapping table, the higher the priority is, the larger the mapping value is, while the lower the priority is, the smaller the mapping value is.

The first mapping value and the second mapping value are substituted into the first function, and a value calculated by the first function is taken as the target queuing value.

The step of determining the queuing value of the target data stream according to the priority of the target device and the parameter carried by the interaction request as the target queuing value, further includes: if the priority data in the parameter carried by the interaction request contains the user priority and the user priority is a preset priority, taking the preset queuing value as the target queuing value; and if the priority data in the parameter carried by the interaction request does not contain the user priority, or the user priority in the priority data in the parameter carried by the interaction request is not the preset priority, determining the queuing value of the target data stream as the target queuing value according to the priority of the target device and the parameter carried by the interaction request. By including the user priority in the priority data in the parameter carried by the interaction request, and the user priority being the preset priority, the preset queuing value is taken as the target queuing value, which is beneficial for the user to actively seize the highest queuing value and meet personalized needs of the user. It can be understood that the preset queuing value is greater than a queuing value that can be calculated by the first function in any case.

The method for interaction between the intelligent device and the vehicle-mounted system further includes the following steps.

At S51, according to a preset time interval, the interactive data stream is acquired from the interactive queuing library as a data stream to be analyzed by using a traversal method.

Specifically, the interactive queuing library is traversed once at the preset time interval, and in the process of traversing the interactive queuing library, each traversed interactive data stream is taken as one data stream to be analyzed.

At S52, a request generating duration of the interaction request corresponding to the data stream to be analyzed is acquired as a target duration.

Specifically, a current time is subtracted from a generation time of the interaction request corresponding to the data stream to be analyzed to obtain the request generating duration of the interaction request corresponding to the data stream to be analyzed, and the request generating duration is taken as the target duration.

At S53, an elapsed queuing value is generated according to the target duration, the interaction type corresponding to the data stream to be analyzed, and the priority of the target device corresponding to the data stream to be analyzed.

Specifically, a mapping value is mapped in a third mapping table as a third mapping value according to the interaction type corresponding to the data stream to be analyzed; a mapping value is mapped in a fourth mapping table as a fourth mapping value according to the priority of the target device corresponding to the data stream to be analyzed; and the third mapping value and the fourth mapping value are input into a second function for calculation to obtain the elapsed queuing value.

Alternatively, the second function is a linear function fitted by a curve fitting method.

At S54, if the elapsed queuing value is greater than a preset threshold corresponding to the interaction type corresponding to the data stream to be analyzed, the associated data corresponding to the data stream to be analyzed is deleted from the interactive queuing library.

Specifically, if the elapsed queuing value is greater than the preset threshold corresponding to the interaction type corresponding to the data stream to be analyzed, it means that the data stream to be analyzed is not necessary to be sent to the vehicle-mounted system in this case, so the associated data corresponding to the data stream to be analyzed is deleted from the interactive queuing library. Therefore, a storage space occupied by the interactive queuing library is reduced without affecting the user experience.

At S55, if the elapsed queuing value is less than or equal to the preset threshold corresponding to the interaction type corresponding to the data stream to be analyzed, the elapsed queuing value is subtracted from the target queuing value corresponding to the data stream to be analyzed as a queuing value to be processed, and the target queuing value corresponding to the data stream to be analyzed in the interactive queuing library is replaced according to the queuing value to be processed.

Specifically, if the elapsed queuing value is less than or equal to the preset threshold corresponding to the interaction type corresponding to the data stream to be analyzed, it means that the data stream to be analyzed still needs to be sent to the vehicle-mounted system in this case, so the elapsed queuing value is subtracted from the target queuing value corresponding to the data stream to be analyzed as the queuing value to be processed, and the target queuing value corresponding to the data stream to be analyzed in the interactive queuing library is replaced according to the queuing value to be processed, thus updating the target queuing value in the interactive queuing library.

It can be understood that the traversing of all the interactive data streams in the interactive queuing library is completed by repeatedly executing the step S52 to the step S55, wherein one interactive data stream in the interactive queuing library is processed by executing the step S52 to the step S55 once.

At S56, after traversing the interactive queuing library, the interactive queuing library is sorted according to the target queuing value.

Specifically, after traversing the interactive queuing library, that is, executing the step S52 to the step S55 once for each interactive data stream in the interactive queuing library, the interactive queuing library is sorted according to the target queuing value by adopting a preset queuing mode with the interactive queuing library, which provides a basis for quickly extracting the interactive data stream from the interactive queuing library and sending the data stream, to the vehicle-mounted system.

At S6, the interactive data stream in the interactive queuing library is sent to the vehicle-mounted system.

Specifically, the interactive data stream with the highest target queuing value is extracted from the interactive queuing library, and the extracted interactive data stream is sent to the vehicle-mounted system, and when the sending is completed, the sent interactive data stream is deleted from the interactive queuing library.

It can be understood that the target data stream with a target queuing value being a first value is sent to the vehicle-mounted system before the target data stream with a target queuing value being a second value, wherein the first value is greater than the second value.

This embodiment enables the intelligent device and the vehicle-mounted system with different operating systems to be interconnected, which is beneficial to fully improving the automobile third-party application experience. In addition, the queuing value of the target data stream is determined according to the priority of the target device and the parameter carried by the interaction request, and the target data stream and the target queuing value are added to the interactive queuing library as associated data, thus providing a foundation for effective queuing execution of the target data stream and further improving the automobile third-party application experience.

In one embodiment, the method further includes the following steps.

At S01, an automatic connection request is acquired.

Specifically, the automatic connection request sent by the intelligent device is acquired. It can be understood that the intelligent device automatically sends the automatic connection request to the adapter device when entering a scanning range of the adapter device.

The automatic connection request is a request for automatically performing communication connection.

It can be understood that before acquiring the automatic connection request, the intelligent device corresponding to the automatic connection request has been successfully paired with the adapter device.

At S02, communication connection between the intelligent device corresponding to the automatic connection request and the adapter device is established.

Specifically, the communication connection between the intelligent device corresponding to the automatic connection request and the adapter device is established, and the intelligent device in this case is taken as the target device.

At S03, it is judged whether the operating system of the vehicle-mounted system and the operating system of the intelligent device corresponding to the automatic connection request are the same.

At S04, if the operating systems are the same, the interaction mode corresponding to the intelligent device corresponding to the automatic connection request is determined as the forwarding mode.

Specifically, if the operating systems are the same, that is, the operating system of the vehicle-mounted system and the operating system of the intelligent device corresponding to the automatic connection request are the same, it means that no conversion is needed in this case. Therefore, the interaction mode corresponding to the intelligent device corresponding to the automatic connection request is determined as the forwarding mode.

At S05, if the operating systems are not the same, the interaction mode corresponding to the intelligent device corresponding to the automatic connection request is determined as the conversion mode.

Specifically, if the operating systems are not the same, that is, the operating system of the vehicle-mounted system and the operating system of the intelligent device corresponding to the automatic connection request are not the same, it means that conversion is needed in this case. Therefore, the interaction mode corresponding to the intelligent device corresponding to the automatic connection request is determined as the conversion mode.

In this embodiment, the interaction mode is determined every time the communication connection between the intelligent device and the adapter device corresponding to the automatic connection request is newly established, which provides a foundation for the interconnection between the intelligent device and the vehicle-mounted system with different operating systems.

In one embodiment, the step of establishing the communication connection between the intelligent device and the adapter device corresponding to the automatic connection request, includes the following steps.

At S021, it is judged whether a connection configuration corresponding to the intelligent device corresponding to the automatic connection request is allowed to be automatically connected.

The connection configuration corresponding to the intelligent device corresponding to the automatic connection request is data pre-stored in the adapter device by the intelligent device corresponding to the automatic connection request.

Specifically, the connection configuration corresponding to the intelligent device corresponding to the automatic connection request is acquired from a storage space of the intelligent device, and then it is judged whether the connection configuration corresponding to the intelligent device corresponding to the automatic connection request is allowed to be automatically connected.

It can be understood that if there is no connection configuration corresponding to the intelligent device corresponding to the automatic connection request in the storage space of the intelligent device, it is directly determined that the connection configuration corresponding to the intelligent device corresponding to the automatic connection request is allowed to be automatically connected.

At S022, if the connection configuration is allowed to be automatically connected, the communication connection between the intelligent device corresponding to the automatic connection request and the adapter device is established.

Specifically, if the connection configuration is allowed to be automatically connected, that is, the connection configuration corresponding to the intelligent device corresponding to the automatic connection request is allowed to be automatically connected, it means that the intelligent device corresponding to the automatic connection request and the adapter device can be automatically connected in this case. Therefore, the communication connection between the intelligent device corresponding to the automatic connection request and the adapter device is established.

At S023, if the connection configuration is not allowed to be automatically connected, the processing of the automatic connection request is ended.

Specifically, the connection configuration is not allowed to be automatically connected, that is, the connection configuration corresponding to the intelligent device corresponding to the automatic connection request is not allowed to be automatically connected, it means that the intelligent device corresponding to the automatic connection request and the adapter device cannot be automatically connected in this case. Therefore, the processing of the automatic connection request is ended.

It can be understood that in another embodiment of the present application, the user can initiate a manual connection request in the intelligent device, and the adapter device establishes a communication connection between the intelligent device and the adapter device corresponding to the manual connection request based on the manual connection request. The manual connection request is a request for automatically performing communication connection.

In this embodiment, the communication connection between the intelligent device corresponding to the automatic connection request and the adapter device is automatically established when the connection configuration corresponding to the intelligent device corresponding to the automatic connection request is allowed to be automatically connected, and the processing of the automatic connection request is ended when the connection configuration of the intelligent device corresponding to the automatic connection request is not allowed to be automatically connected, thus avoiding too many intelligent devices connected to the adapter device at the same time, and meeting a requirement that the user does not want the intelligent device thereof to automatically connect the adapter device.

In one embodiment, the step of judging whether the interaction type corresponding to the interaction request is within the processing range according to the interaction mode corresponding to the target device and the allowable type table corresponding to the vehicle-mounted system, includes the following steps.

At S211, a working mode of the adapter device is acquired.

The working mode of the adapter device includes: an open mode, a navigation mode and a fixed connection mode. The open mode is a mode in which the interaction type is not limited and at least one intelligent device can be connected. The navigation mode is a mode that only deals with the interaction type being the navigation type. The fixed connection mode is a mode in which only one intelligent device is connected.

Specifically, the user may set the working mode of the adapter device through keys of the adapter device, or may set the working mode of the adapter device through the intelligent device in in communication connection with the adapter device, and the set working mode of the adapter device will be stored in a storage space of the adapter device. Therefore, the working mode of the adapter device is acquired from the storage space of the adapter device.

At S212, if the working mode is the open mode, it is judged whether the interaction type corresponding to the interaction request is within the processing range according to the interaction mode corresponding to the target device and the allowable type table corresponding to the vehicle-mounted system.

Specifically, if the working mode is the open mode, it means that the interaction type is not limited and at least one intelligent device can be connected. Therefore, according to the interaction mode corresponding to the target device and the allowable type table corresponding to the vehicle-mounted system, it is judged whether the interaction type corresponding to the interaction request is within the processing range.

At S213, if the working mode is the navigation mode; therefore, when the interaction type corresponding to the interaction request is the navigation type, it is judged whether the interaction type corresponding to the interaction request is within the processing range according to the interaction mode corresponding to the target device and the allowable type table corresponding to the vehicle-mounted system.

Specifically, if the working mode is the navigation mode, it means that only the interaction type being the navigation type is processed. Therefore, when the interaction type corresponding to the interaction request is the navigation type, it is judged whether the interaction type corresponding to the interaction request is within the processing range according to the interaction mode corresponding to the target device and the allowable type table corresponding to the vehicle-mounted system.

It can be understood that if the working mode is the navigation mode; therefore, when the interaction type corresponding to the interaction request is not the navigation type, the processing of the interaction request is ended.

At S214, if the working mode is the fixed connection mode; therefore, when the target device is the intelligent device corresponding to the fixed connection mode, it is judged whether the interaction type corresponding to the interaction request is within the processing range according to the interaction mode corresponding to the target device and the allowable type table corresponding to the vehicle-mounted system.

Specifically, if the working mode is the fixed connection mode, it means that only one intelligent device is connected. Therefore, when the target device is the intelligent device corresponding to the fixed connection mode, it means that the target device is an intelligent device allowed to be interacted with the vehicle-mounted system in this case, and it is judged whether the interaction type corresponding to the interaction request is within the processing range according to the interaction mode corresponding to the target device and the allowable type table corresponding to the vehicle-mounted system.

It can be understood that if the working mode is the fixed connection mode, and when the target device is not an intelligent device corresponding to the fixed connection mode, it means that the target device is an intelligent device allowed to be interacted with the vehicle-mounted system, the processing of the interaction request is ended.

In this embodiment, according to the working mode of the adapter device, different strategies are adopted to process the interaction request, which meets the personalized needs of the user and further improves the automobile third-party application experience.

In one embodiment, the step of sending the interactive data stream in the interactive queuing library to the vehicle-mounted system, includes the following steps.

At S61, the interactive data stream with the highest priority is taken from the interactive queuing library as a data stream to be processed.

Specifically, the interactive data stream with the highest priority is extracted from the interactive queuing library, and the extracted interactive data stream is taken as the data stream to be processed.

At S62, if a type of the data stream to be processed is audio or video, a vehicle speed of a vehicle corresponding to the vehicle-mounted system is acquired.

Specifically, if the type of the data stream to be processed is audio or video, it means that the vehicle-mounted system needs to play audio or video, and it is necessary to further consider whether a volume of the played audio or video affects a driving safety of the vehicle, so the vehicle speed of the vehicle corresponding to the vehicle-mounted system is acquired.

At S63, if the vehicle speed is greater than a preset value, a volume of the data stream to be processed is adjusted according to a preset volume threshold to obtain a data stream to be executed.

Specifically, if the vehicle speed is greater than the preset value, it means that it is necessary to consider that the volume of the played audio or video will affect the driving safety of the vehicle in this case. Therefore, when the volume in the data stream to be processed is greater than the preset volume threshold, the preset volume threshold is taken as the volume in the data stream to be processed, and the adjusted data stream to be processed is taken as the data stream to be executed. When the volume in the data stream to be processed is less than or equal to the preset volume threshold, the volume in the data stream to be processed is not adjusted and the data stream to be processed is directly taken as the data stream to be executed.

At S64, if the vehicle speed less than or equal to the preset value, the data stream to be processed is taken as the data stream to be executed.

Specifically, if the vehicle speed is less than or equal to the preset value, it means that there is no need to consider an influence of the volume of the played audio or video on the driving safety of the vehicle, so the data stream to be processed is directly taken as the data stream to be executed.

At S65, the data stream to be executed is sent to the vehicle-mounted system.

Specifically, the data stream to be executed is sent to the vehicle-mounted system, and when the sending is completed, the interactive data stream corresponding to the sent data stream to be executed is deleted from the interactive queuing library. Therefore, it is ensured that the volume played based on the data stream to be executed will not affect the driving safety of the vehicle.

In this embodiment, if the vehicle speed is greater than the preset value, the volume of the data stream to be processed is adjusted according to the preset volume threshold to obtain the data stream to be executed, and if the vehicle speed is less than or equal to the preset value, the data stream to be processed is regarded as the data stream to be executed, thus avoiding the influence of the volume of the data stream to be executed on the driving safety of the vehicle, improving an automation degree of the present application and further improving the automobile third-party application experience.

In one embodiment, the step of judging whether the interaction type corresponding to the interaction request is within the processing range according to the interaction mode corresponding to the target device and the allowable type table corresponding to the vehicle-mounted system, further includes the following steps.

At S221, when the interaction type corresponding to the interaction request is a telephone type and a telephone transfer mode corresponding to the target device is call permission, a call channel between the target device and the vehicle-mounted system is constructed according to the interaction mode corresponding to the target device.

Specifically, when the interaction type corresponding to the interaction request is the telephone type and the telephone transfer mode corresponding to the target device is call permission, it means that the interaction request is to answer calls through the vehicle-mounted system, and it is allowed to answer calls through the vehicle-mounted system. Therefore, according to the interaction mode corresponding to the target device, the call channel between the target device and the vehicle-mounted system is constructed to realize answering calls through the vehicle-mounted system.

The telephone transfer mode corresponding to the target device is data pre-stored in the adapter device by the target device before acquiring the interaction request sent by the target device.

The call transfer mode includes: call permission or call prohibition.

At S222, when the interaction type corresponding to the interaction request is the telephone type and the telephone transfer mode corresponding to the target device is call prohibition, an incoming call reminding signal is generated according to the interaction request, and voice playing is carried out according to the incoming call reminding signal.

Specifically, when the interaction type corresponding to the interaction request is the telephone type and the telephone transfer mode corresponding to the target device is call prohibition, it means that the interaction request is to answer calls through the vehicle-mounted system, but it is not allowed to answer calls through the vehicle-mounted system. Therefore, the incoming call reminding signal is generated according to the interaction request, and voice playing is carried out according to the incoming call reminding signal. Therefore, the user is reminded that there is an incoming call through voice playing, but the incoming call is not allowed to be answered through the vehicle-mounted system. It can be understood that when the interaction type corresponding to the interaction request is the telephone type and the telephone transfer mode corresponding to the target device is call prohibition, it is not necessary to process the interaction corresponding to the interaction request through the vehicle-mounted system.

At S223, when the interaction type corresponding to the interaction request is a non-telephone type, it is judged whether the interaction type corresponding to the interaction request is within the processing range according to the interaction mode corresponding to the target device and the allowable type table corresponding to the vehicle-mounted system.

Specifically, if the interaction type corresponding to the interaction request is the non-telephone type, it means that interactions other than answering calls need to be processed by the vehicle-mounted system. Therefore, it is judged whether the interaction type corresponding to the interaction request is within the processing range according to the interaction mode corresponding to the target device and the allowable type table corresponding to the vehicle-mounted system.

In this embodiment, when the interaction type corresponding to the interaction request is the telephone type and the telephone transfer mode corresponding to the target device is call permission, the call channel between the target device and the vehicle-mounted system is constructed according to the interaction mode corresponding to the target device, and when the interaction type corresponding to the interaction request is the telephone type and the telephone transfer mode corresponding to the target device is call prohibition, the incoming call reminding signal is generated according to the interaction request, and voice playing is carried out according to the incoming call reminding signal, so that incoming calls of all target devices are prevented from being connected to the vehicle-mounted system, meeting the personalized needs of the user, and further improving the automobile third-party application experience.

In one embodiment, when the interaction type corresponding to the interaction request is the telephone type and the telephone transfer mode corresponding to the target device is call permission, the step of constructing the call channel between the target device and the vehicle-mounted system according to the interaction mode corresponding to the target device, includes the following steps.

At S2211, when the interaction type corresponding to the interaction request is the telephone type, the telephone transfer mode corresponding to the target device is call permission, and an incoming number attribute corresponding to the interaction request is within a forwarding-allowable number range corresponding to the target device, the call channel between the target device and the vehicle-mounted system is constructed according to the interaction mode corresponding to the target device.

Specifically, when the interaction type corresponding to the interaction request is the telephone type, the telephone transfer mode corresponding to the target device is call permission, and the incoming number attribute corresponding to the interaction request is within the forwarding-allowable number range corresponding to the target device, it means that the interaction request is to answer calls through the vehicle-mounted system, it is allowed to answer calls through the vehicle-mounted system, and the incoming number corresponding to the interaction request is what the user wants to answer. Therefore, the call channel between the target device and the vehicle-mounted system is constructed according to the interaction mode corresponding to the target device.

At S2212, when the interaction type corresponding to the interaction request is the telephone type and the telephone transfer mode corresponding to the target device is call permission, and the incoming number attribute corresponding to the interaction request is out of the forwarding-allowable number range corresponding to the target device, the incoming call reminding signal is generated according to the interaction request and voice playing is carried out according to the incoming call reminding signal.

Specifically, when the interaction type corresponding to the interaction request is the telephone type, the telephone transfer mode corresponding to the target device is call permission, and the incoming number attribute corresponding to the interaction request is out of the forwarding-allowable number range corresponding to the target device, it means that the interaction request is to answer calls through the vehicle-mounted system, it is allowed to answer calls through the vehicle-mounted system, but the incoming number corresponding to the interaction request is not what the user wants to answer. Therefore, the incoming call reminding signal is generated according to the interaction request, and voice playing is carried out according to the incoming call reminding signal.

In this embodiment, the call channel between the target device and the vehicle-mounted system can be constructed only when the interaction request is to answer calls through the vehicle-mounted system, it is allowed to answer calls through the vehicle-mounted system, and the incoming number corresponding to the interaction request is what the user wants to answer, thus avoiding all incoming calls of the target device that are allowed to answer calls through the vehicle-mounted system from being connected to the vehicle-mounted system, meeting the personalized needs of the user and further improving the automobile third-party application experience.

Figure 3:
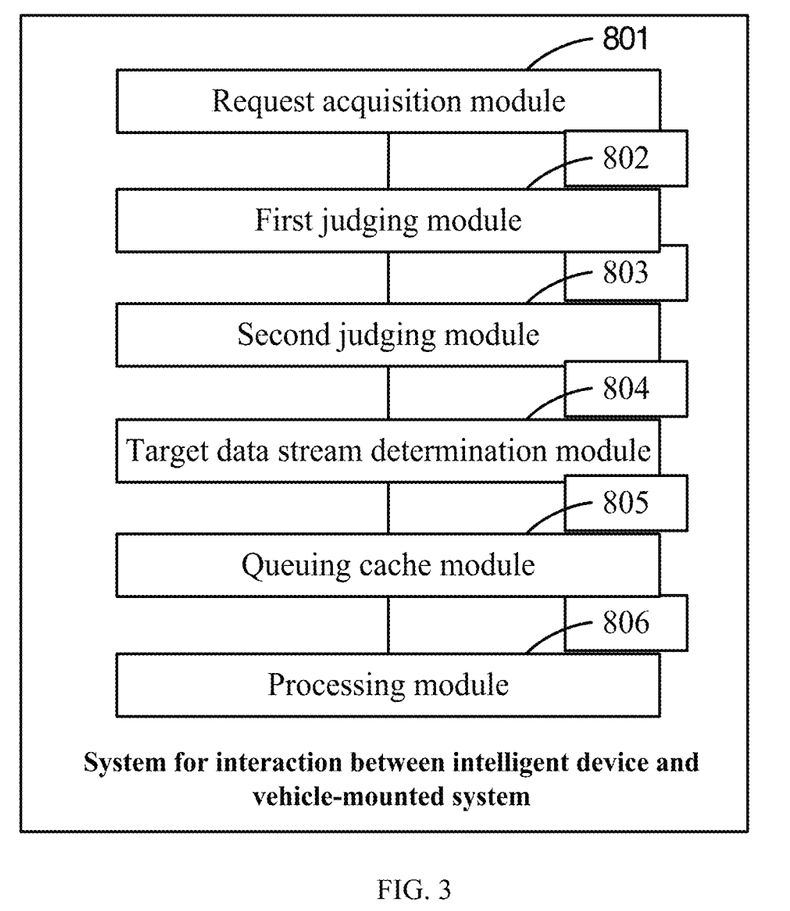
FIG. 3 is a structural block diagram of a system for interaction between an intelligent device and a vehicle-mounted system in one embodiment.

As shown in FIG. 3, in one embodiment, there is provided a system for interaction between an intelligent device and a vehicle-mounted system, wherein the system is applied to an adapter device, and the system includes:

a request acquisition module 801 configured for acquiring an interaction request sent by a target device, wherein the target device is an intelligent device in communication connection with the adapter device successfully;

a first judging module 802 configured for judging whether an interaction type corresponding to the interaction request is within a processing range according to an interaction mode corresponding to the target device and an allowable type table corresponding to the vehicle-mounted system;

a second judging module 803 configured for, when the interaction type is within the allowable type table corresponding to the vehicle-mounted system, judging whether the interaction mode corresponding to the target device is a forwarding mode;

a target data stream determination module 804 configured for, when the interaction type is the forwarding mode, taking an interactive data stream corresponding to the interaction request as a target data stream; otherwise, converting the interactive data stream compiled based on an operating system of the target device into an interactive data stream corresponding to an operating system of the vehicle-mounted system as the target data stream;

a queuing cache module 805 configured for determining a queuing value of the target data stream according to a priority of the target device and a parameter carried by the interaction request as a target queuing value, and adding the target data stream and the target queuing value as associated data to an interactive queuing library; and a processing module 806 configured for sending the interactive data stream in the interactive queuing library to the vehicle-mounted system.

This embodiment enables the intelligent device and the vehicle-mounted system with different operating systems to be interconnected, which is beneficial to fully improving the automobile third-party application experience. In addition, the queuing value of the target data stream is determined as the target queuing value according to the priority of the target device and the parameter carried by the interaction request, and the target data stream and the target queuing value are added to the interactive queuing library as the associated data, thus providing a foundation for the effective queuing execution of the target data stream and further improving the automobile third-party application experience.

Figure 4:
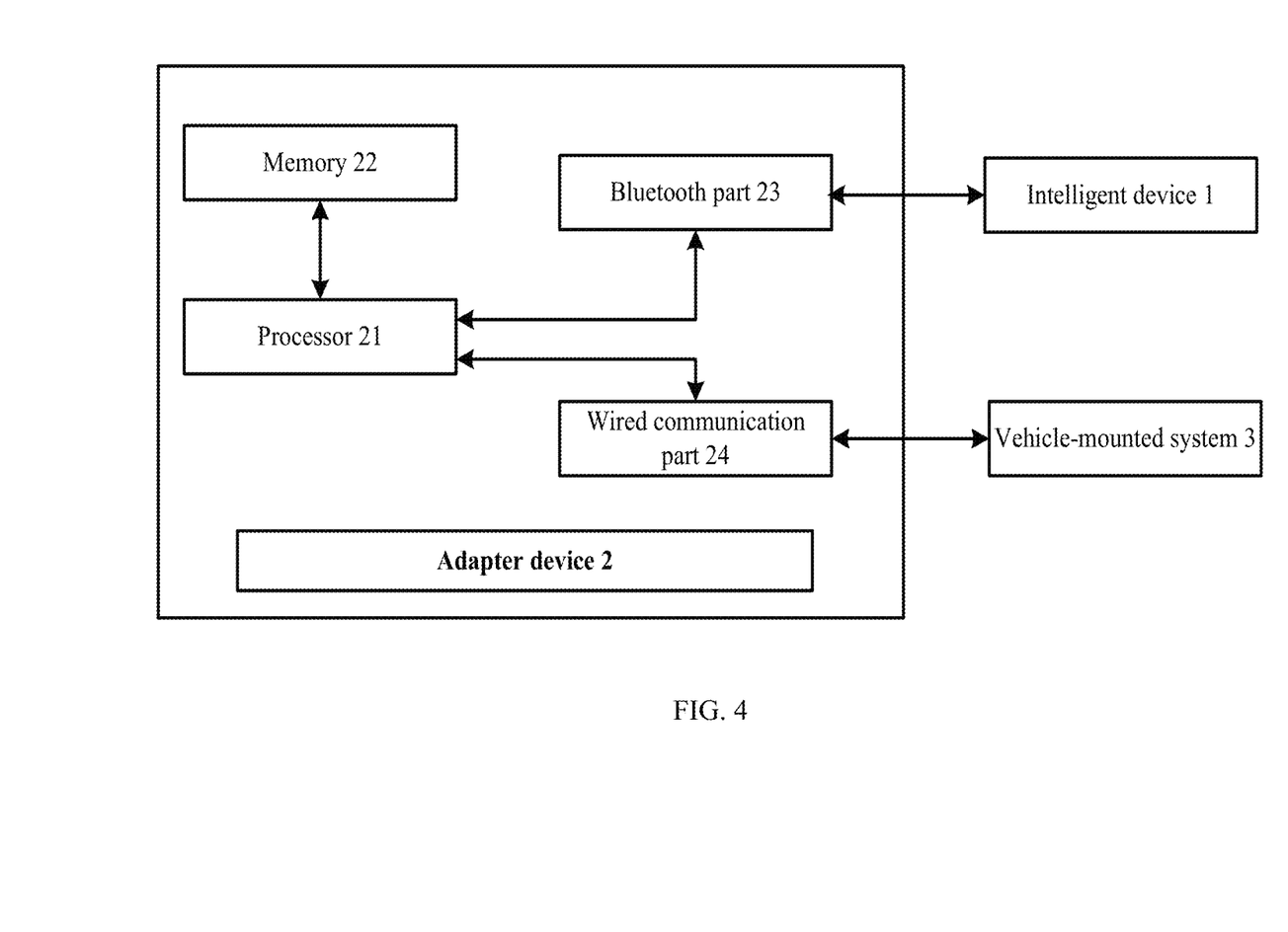
FIG. 4 is a structural block diagram of an adapter device in one embodiment.

As shown in FIG. 4, in one embodiment, there is provided an adapter device, wherein the adapter device includes: a wired communication part, a Bluetooth part, a memory, a processor and a computer program stored in the memory and executable on the processor, wherein the processor is connected with the wired communication part and the Bluetooth part, the adapter device is in communication connection with a vehicle-mounted system through the wired communication part, the adapter device is in communication connection with a target device through the Bluetooth part, and the processor executes the computer program to realize the steps of the method for interaction between the intelligent device and the vehicle-mounted system mentioned above.

The wired communication part is a part that communicates based on a wired communication technology.

The Bluetooth part is a part that communicates based on a Bluetooth technology.

This embodiment enables the intelligent device and the vehicle-mounted system with different operating systems to be interconnected, which is beneficial to fully improving the automobile third-party application experience. In addition, the queuing value of the target data stream is determined as the target queuing value according to the priority of the target device and the parameter carried by the interaction request, and the target data stream and the target queuing value are added to the interactive queuing library as the associated data, thus providing a foundation for the effective queuing execution of the target data stream and further improving the automobile third-party application experience.

The embodiments mentioned above are only used to illustrate the technical solutions of the present invention, rather than limiting the present invention. Although the present invention has been described in detail with reference to the foregoing embodiments, those with ordinary skills in the art should understand that: they can still modify the technical solutions set forth by the above embodiments, or make equivalent substitutions to part of the technical features of them. However, these modifications, changes or replacements do not make the essence of the corresponding technical solutions deviate from the spirit and scope of the technical solutions of each embodiment of the present invention, and should all be covered within the protection scope of the present invention.

The invention claimed is:

1. A method for interaction between an intelligent device and a vehicle-mounted system, wherein the method is applied to an adapter device, and the method comprises:
acquiring an interaction request sent by a target device, wherein the target device is an intelligent device in communication connection with the adapter device successfully;
judging whether an interaction type corresponding to the interaction request is within a processing range according to an interaction mode corresponding to the target device and an allowable type table corresponding to the vehicle-mounted system;
if the interaction type is within the processing range, judging whether the interaction mode corresponding to the target device is a forwarding mode;
if the interaction type is the forwarding mode, taking an interactive data stream corresponding to the interaction request as a target data stream; otherwise, converting the interactive data stream compiled based on an operating system of the target device into an interactive data stream corresponding to an operating system of the vehicle-mounted system as the target data stream;
determining a queuing value of the target data stream according to a priority of the target device and a parameter carried by the interaction request as a target queuing value, and adding the target data stream and the target queuing value as associated data to an interactive queuing library; and
sending the interactive data stream in the interactive queuing library to the vehicle-mounted system.

2. The method for interaction between the intelligent device and the vehicle-mounted system according to claim 1, wherein the method further comprises:
acquiring an automatic connection request;
establishing the communication connection between the intelligent device and the adapter device corresponding to the automatic connection request;
judging whether the operating system of the vehicle-mounted system and the operating system of the intelligent device corresponding to the automatic connection request are the same;
if the two operating systems are the same, determining the interaction mode corresponding to the intelligent device corresponding to the automatic connection request as the forwarding mode; and
if the two operating systems are not the same, determining the interaction mode corresponding to the intelligent device corresponding to the automatic connection request as a conversion mode.

3. The method for interaction between the intelligent device and the vehicle-mounted system according to claim 2, wherein the step of establishing the communication connection between the intelligent device and the adapter device corresponding to the automatic connection request, comprises:
judging whether a connection configuration corresponding to the intelligent device corresponding to the automatic connection request is allowed to be automatically connected;
if the connection configuration is allowed to be automatically connected, establishing the communication connection between the intelligent device and the adapter device corresponding to the automatic connection request; and
if the connection configuration is not allowed to be automatically connected, ending the processing of the automatic connection request.

4. The method for interaction between the intelligent device and the vehicle-mounted system according to claim 1, wherein the step of judging whether the interaction type corresponding to the interaction request is within the processing range according to the interaction mode corresponding to the target device and the allowable type table corresponding to the vehicle-mounted system, comprises:
acquiring a working mode of the adapter device;
if the working mode is an open mode, judging whether the interaction type corresponding to the interaction request is within the processing range according to the interaction mode corresponding to the target device and the allowable type table corresponding to the vehicle-mounted system;
if the working mode is a navigation mode, judging whether the interaction type corresponding to the interaction request is within the processing range according to the interaction mode corresponding to the target device if the interaction type corresponding to the interaction request is a navigation type; and
if the working mode is a fixed connection mode, judging whether the interaction type corresponding to the interaction request is within the processing range according to the interaction mode corresponding to the target device and the allowable type table corresponding to the vehicle-mounted system when the target device is an intelligent device corresponding to the fixed connection mode.

5. The method for interaction between the intelligent device and the vehicle-mounted system according to claim 1, wherein the step of sending the interactive data stream in the interactive queuing library to the vehicle-mounted system, comprises:
taking out the interactive data stream with the highest priority from the interactive queuing library as a data stream to be processed;
if a type of the data stream to be processed is audio or video, acquiring a vehicle speed of a vehicle corresponding to the vehicle-mounted system;
if the vehicle speed is greater than a preset value, adjusting a volume of the data stream to be processed according to a preset volume threshold to obtain a data stream to be executed;
if the vehicle speed less than or equal to the preset value, taking the data stream to be processed as the data stream to be executed; and
sending the data stream to be executed to the vehicle-mounted system.

6. The method for interaction between the intelligent device and the vehicle-mounted system according to claim 1, wherein the step of judging whether the interaction type corresponding to the interaction request sent by the target device is within the processing range according to the interaction mode corresponding to the target device and the allowable type table corresponding to the vehicle-mounted system, further comprises:
  when the interaction type corresponding to the interaction request is a telephone type and a telephone transfer mode corresponding to the target device is call permission, constructing a call channel between the target device and the vehicle-mounted system according to the interaction mode corresponding to the target device;
  when the interaction type corresponding to the interaction request is the telephone type and the telephone transfer mode corresponding to the target device is call prohibition, generating an incoming call reminding signal according to the interaction request, and carrying out voice playing according to the incoming call reminding signal; and
  when the interaction type corresponding to the interaction request is a non-telephone type, judging whether the interaction type corresponding to the interaction request is within the processing range according to the interaction mode corresponding to the target device and the allowable type table corresponding to the vehicle-mounted system.

7. The method for interaction between the intelligent device and the vehicle-mounted system according to claim 6, the step of, when the interaction type corresponding to the interaction request is the telephone type and the telephone transfer mode corresponding to the target device is call permission, the constructing the call channel between the target device and the vehicle-mounted system according to the interaction mode corresponding to the target device, comprises:
  when the interaction type corresponding to the interaction request is the telephone type, the telephone transfer mode corresponding to the target device is call permission, and an incoming number attribute corresponding to the interaction request is within a forwarding-allowable number range corresponding to the target device, constructing the call channel between the target device and the vehicle-mounted system according to the interaction mode corresponding to the target device; and
  when the interaction type corresponding to the interaction request is the telephone type, the telephone transfer mode corresponding to the target device is call permission, and the incoming number attribute corresponding to the interaction request is out of the forwarding-allowable number range corresponding to the target device, generating the incoming call reminding signal according to the interaction request and carrying out voice playing according to the incoming call reminding signal.

8. The method for interaction between the intelligent device and the vehicle-mounted system according to claim 1, wherein the step of determining the queuing value of the target data stream according to the priority of the target device and the parameter carried by the interaction request as the target queuing value, comprises:
  mapping a mapping value in a first mapping table as a first mapping value according to the priority of the target device;
  mapping a mapping value in a second mapping table as a second mapping value according to priority data in the parameter carried by the interaction request; and
  inputting the first mapping value and the second mapping value into a first function for calculation to obtain the target queuing value;
  wherein, the priority data in the parameter carried by the interaction request comprises: one or more of a priority of the interaction type corresponding to the interaction request and a user priority.

9. An adapter device, wherein the adapter device comprises: a wired communication part, a Bluetooth part, a memory, a processor and a computer program stored in the memory and executable on the processor, wherein the processor is connected with the wired communication part and the Bluetooth part, the adapter device is in communication connection with a vehicle-mounted system through the wired communication part, the adapter device is in communication connection with a target device through the Bluetooth part, and the processor executes the computer program to realize the steps of the method for interaction between the intelligent device and the vehicle-mounted system according to claim 1.

10. A system for interaction between an intelligent device and a vehicle-mounted system, wherein the system is applied to an adapter device, and the system comprises:
  a request acquisition module configured for acquiring an interaction request sent by a target device, wherein the target device is an intelligent device in communication connection with the adapter device successfully;
  a first judging module configured for judging whether an interaction type corresponding to the interaction request is within a processing range according to an interaction mode corresponding to the target device and an allowable type table corresponding to the vehicle-mounted system;
  a second judging module configured for, if the interaction type is within the processing range, judging whether the interaction mode corresponding to the target device is a forwarding mode;
  a target data stream determination module configured for, if the interaction type is the forwarding mode, taking an interactive data stream corresponding to the interaction request as a target data stream; otherwise, converting the interactive data stream compiled based on an operating system of the target device into an interactive data stream corresponding to an operating system of the vehicle-mounted system as the target data stream;
  a queuing cache module configured for determining a queuing value of the target data stream according to a priority of the target device and a parameter carried by the interaction request as a target queuing value, and adding the target data stream and the target queuing value as associated data to an interactive queuing library; and
  a processing module configured for sending the interactive data stream in the interactive queuing library to the vehicle-mounted system.

\* \* \* \* \*